(12) United States Patent
Aikawa et al.

(10) Patent No.: US 10,804,557 B2
(45) Date of Patent: Oct. 13, 2020

(54) ZIRCONIA ELECTROLYTE AND METHOD FOR PRODUCING ZIRCONIA ELECTROLYTE

(71) Applicant: NIPPON SHOKUBAI CO., LTD., Osaka (JP)

(72) Inventors: Norikazu Aikawa, Hyogo (JP); Kazuo Hata, Osaka (JP); Nobuhisa Noda, Osaka (JP)

(73) Assignee: Nippon Shokubai Co., Ltd., Osaka (JP)

(*) Notice: Subject to any disclaimer, the term of this patent is extended or adjusted under 35 U.S.C. 154(b) by 140 days.

(21) Appl. No.: 15/884,567

(22) Filed: Jan. 31, 2018

(65) Prior Publication Data

US 2018/0226671 A1 Aug. 9, 2018

(30) Foreign Application Priority Data

Feb. 9, 2017 (JP) ................................. 2017-022120

(51) Int. Cl.
| | |
|---|---|
| *H01M 8/1253* | (2016.01) |
| *H01M 4/88* | (2006.01) |
| *C04B 35/634* | (2006.01) |
| *H01M 8/00* | (2016.01) |
| *C04B 35/486* | (2006.01) |
| *H01M 8/124* | (2016.01) |

(52) U.S. Cl.
CPC ......... *H01M 8/1253* (2013.01); *C04B 35/486* (2013.01); *C04B 35/6342* (2013.01); *C04B 35/63424* (2013.01); *H01M 4/88* (2013.01); *H01M 8/006* (2013.01); *C04B 2235/3224* (2013.01); *C04B 2235/3225* (2013.01); *C04B 2235/3229* (2013.01); *C04B 2235/5409* (2013.01); *C04B 2235/5445* (2013.01); *C04B 2235/5463* (2013.01); *C04B 2235/6025* (2013.01); *C04B 2235/762* (2013.01); *C04B 2235/77* (2013.01); *H01M 2008/1293* (2013.01); *H01M 2250/10* (2013.01); *H01M 2300/0077* (2013.01); *Y02B 90/14* (2013.01); *Y02E 60/525* (2013.01); *Y02P 70/56* (2015.11)

(58) Field of Classification Search
CPC combination set(s) only.
See application file for complete search history.

(56) References Cited

U.S. PATENT DOCUMENTS

| | | | |
|---|---|---|---|
| 9,112,215 B1* | 8/2015 | Cross ....................... | H01M 8/18 |
| 2005/0142431 A1* | 6/2005 | Shimomura ........ | H01M 4/8605 |
| | | | 429/509 |
| 2008/0102337 A1* | 5/2008 | Shimada ............... | H01M 8/124 |
| | | | 429/482 |
| 2013/0034796 A1* | 2/2013 | Hata .................... | H01M 8/1246 |
| | | | 429/496 |
| 2016/0053039 A1 | 2/2016 | Mikayama | |

FOREIGN PATENT DOCUMENTS

| | | |
|---|---|---|
| JP | 4637985 | 2/2011 |
| JP | 4637985 B2 | 2/2011 |
| JP | 2011-082149 | 4/2011 |
| JP | 2011-082149 A | 4/2011 |
| JP | 5555788 | 7/2014 |
| JP | 2014-191940 | 10/2014 |
| JP | 2014-191940 A | 10/2014 |

OTHER PUBLICATIONS

Extended European Search Report dated May 30, 2018 in European Patent Application No. 18000088.7.
Office Action issued in counterpart European Patent Application No. 18000088.7 dated Jan. 13, 2020.

* cited by examiner

*Primary Examiner* — Kaity V Chandler
(74) *Attorney, Agent, or Firm* — Morgan, Lewis & Bockius LLP (57) ABSTRACT

The objective of one or more embodiments of the present invention is to provide a zirconia electrolyte which has high strength and which is suitable for a solid electrolyte layer of a solid oxide fuel cell, and a method for producing a zirconia electrolyte having high strength. The zirconia electrolyte according to one or more embodiments of the present invention is characterized in essentially consisting of zirconia stabilized by one or a plurality of oxides of rare earth selected from the group of scandium, yttrium, cerium, gadolinium and ytterbium, wherein a standard deviation of pore numbers in 10 or more regions having an area of 50 μm² and not overlapping with each other on a fracture surface is 2.5 or more.

19 Claims, 1 Drawing Sheet

US 10,804,557 B2

ZIRCONIA ELECTROLYTE AND METHOD FOR PRODUCING ZIRCONIA ELECTROLYTE

CROSS-REFERENCE TO RELATED APPLICATIONS

This application is related to and claims priority under 35 U.S.C. 119 to Japanese patent application No. 2017-22120, filed on Feb. 9, 2017.

TECHNICAL FIELD

One or more embodiments of the present invention relates to a zirconia electrolyte having high strength, and a method for producing a zirconia electrolyte having high strength.

BACKGROUND

A fuel cell has attracted attention as a clean energy source, and studies for an improvement and practical use of a fuel cell are advancing apace mainly for home power generation, industrial power generation, car power generation or the like. Among such fuel cells, a solid oxide fuel cell (hereinafter abbreviated to "SOFC" in some cases) is expected to be an electrical energy source for home and industry, since SOFC exhibits high generation efficiency and is excellent at long-term stability.

As a material for a solid electrolyte layer of SOFC, ceramics is generally used. This is because ceramics is excellent at electrical property and magnetical property in addition to mechanical property such as heat resistance. In particular, ceramics mainly composed of zirconia is used as a solid electrolyte layer raw material of SOFC, since the zirconia ceramics has excellent properties such as oxide ion conductivity, heat resistance, corrosion resistance and toughness.

In SOFC, for example, a plurality of SOFC unit cells which are produced by laminating an anode layer on one side of an electrolyte layer and a cathode on the other side are stacked in series; as a result, a large load is applied to each layer. In addition, SOFC is exposed to various changes in temperatures, such as high temperature during power generation and atmospheric temperature during non-operation state. Furthermore, a volume of an electrode containing base metal changes under oxidation state and under reduction state. Thus, it is required that each layer has no defect, is homogeneous and has high strength for maintaining stable power generation performance of SOFC for a long time.

A solid electrolyte layer which is mainly composed of zirconia is generally produced by preparing a slurry containing at least a raw material zirconia powder, a solvent and a binder, removing the solvent from the formed slurry to be a green body having a desired form, and sintering the green body at room temperature to remove an organic component or the like. In general, as a binder, poly(meth)acrylic acid is used, since poly(meth)acrylic acid shows good thermal decomposability. On the one hand, when a poly(meth) acrylic binder is used for producing a zirconia sinter, the strength of a green body, which is a precursor of the zirconia sinter, may be insufficient in some cases. It has been known that when polyvinyl butyral is used as a binder, a green body having relatively high strength can be obtained. However, when a ceramic sinter is produced with using a polyvinyl butyral binder, the strength of a green body becomes relatively high but an amount of a remaining carbon is large and pores easily generate.

As binders having good thermal decomposability, Patent documents 1 and 2 disclose a binder for forming a ceramic green sheet and a binder for producing an inorganic sinter which binders contain a graft copolymer having a polyvinyl butyral unit and a poly(meth)acrylic unit.

Among ceramic sinters, particularly high strength is required for a zirconia sinter which is used as a solid electrolyte layer of a solid oxide fuel cell.

Patent Document 1: JP 4637985 B
Patent Document 1: JP 5555788 B

SUMMARY

One or more embodiments of the present invention provide a zirconia electrolyte having high strength, and a method for producing a zirconia electrolyte having high strength.

The inventors made extensive studies. As a result, the inventors completed one or more embodiments of the present invention by finding that a zirconia slurry excellent in dispersion stability can be obtained with using a specific binder, a pore distribution in a zirconia electrolyte can be controlled with using the zirconia slurry, and thus a zirconia electrolyte having high strength can be produced.

Hereinafter, one or more embodiments the present invention is described.

[1] A zirconia electrolyte,
essentially consisting of zirconia stabilized by one or a plurality of oxides of rare earth selected from the group of scandium, yttrium, cerium, gadolinium and ytterbium,
wherein a standard deviation of pore numbers in 10 or more regions having an area of 50 $\mu m^2$ and not overlapping with each other on a fracture surface is 2.5 or more.

[2] The zirconia electrolyte according to the above [1], wherein a standard deviation of pore diameters in the regions is 0.15 $\mu m$ or less.

[3] The zirconia electrolyte according to the above [1], wherein a ratio of a total area of the pores to a total area of the regions is 0.5% or less.

[4] The zirconia electrolyte according to the above [2], wherein a ratio of a total area of the pores to a total area of the regions is 0.5% or less.

[5] The zirconia electrolyte according to the above [1], wherein the zirconia electrolyte is planate.

[6] The zirconia electrolyte according to the above [1], wherein a relative density of the zirconia electrolyte is 99.0% or more.

[7] The zirconia electrolyte according to the above [1], wherein 90% or more of the zirconia is cubical crystal.

[8] A unit cell for a solid oxide fuel cell, comprising the zirconia electrolyte according to the above [1] as a solid electrolyte layer.

[9] A unit cell for a solid oxide fuel cell, comprising the zirconia electrolyte according to the above [2] as a solid electrolyte layer.

[10] A unit cell for a solid oxide fuel cell, comprising the zirconia electrolyte according to the above [3] as a solid electrolyte layer.

[11] A unit cell for a solid oxide fuel cell, comprising the zirconia electrolyte according to the above [4] as a solid electrolyte layer.

[12] A method for producing a zirconia electrolyte, comprising the steps of:
preparing a slurry by mixing a powder of zirconia stabilized by one or a plurality of oxides of rare earth selected from the group of scandium, yttrium, cerium, gadolinium and ytterbium, a solvent and a binder, wherein the binder comprises a graft copolymer having a polyvinyl butyral main chain and a poly(meth)acrylic graft chain, and an amine value of the poly(meth)acrylic graft chain is 1 mg KOH/g or more and 90 mg KOH/g or less, preparing a green body by forming the slurry into a sheet and then drying the sheet, and sintering the green body.

[13] The method according to the above [12], wherein a glass transition temperature of the poly(meth)acrylic graft chain is lower than 0° C.

[14] The method according to the above [12], wherein an acid value of the poly(meth)acrylic graft chain is 0.1 mg KOH/g or more and 15 mg KOH/g or less.

[15] The method according to the above [12], wherein a hydroxy group value of the poly(meth)acrylic graft chain is 1 mg KOH/g or more and 20 mg KOH/g or less.

[16] The method according to the above [12], wherein the zirconia electrolyte is used as a solid electrolyte layer for a solid oxide fuel cell.

The zirconia electrolyte according to one or more embodiments of the present invention has high strength; therefore, for example, the zirconia electrolyte is very suitable as a solid electrolyte layer of SOFC and can improve the durability of SOFC. The zirconia electrolyte can be produced from a slurry containing the specific binder without difficulty. Thus, one or more embodiments of the present invention is industrially very useful, since one or more embodiments of the present invention can extend service life of SOFC and further promote the practical realization of SOFC.

DETAILED DESCRIPTION OF THE EMBODIMENTS

The zirconia electrolyte according to one or more embodiments of the present invention essentially consists of zirconia stabilized by one or a plurality of oxides of rare earth selected from the group of scandium, yttrium, cerium, gadolinium and ytterbium. An amount of a solid-solved rare earth oxide to stabilize zirconia may be appropriately adjusted, and may be adjusted to, for example, 8 mol % or more and 15 mol % or less as an oxide to the total electrolyte containing zirconia. When the amount of the solid-solved rare earth oxide is 8 mol % or more, a ratio of a cubical crystal may become large and a zirconia crystal may be stabilized more surely. On the one hand, the amount of the solid-solved rare earth oxide is 15 mol % or less, an oxide ion conductivity may be improved more surely and thus a performance as an electrolyte may be sufficiently ensured. The amount of the solid-solved rare earth oxide may be 9 mol % or more, and 12 mol % or less, or 11 mol % or less. One of the rare earth oxides may be used, or a plurality of rare earth oxides may be used in combination. When two or more rare earth oxides are used in combination, the above-described amount of the solid-solved rare earth oxide means a summation of molar concentrations of each oxide.

The zirconia electrolyte of one or more embodiments of the present invention essentially consists of the above-described stabilized zirconia. The phrase, "essentially consists of" is not restricted to "consists of" and means that the zirconia electrolyte is substantively composed of the above-described stabilized zirconia other than an unavoidable impurity and an unavoidable residue. Specifically, a ratio of the above-described stabilized zirconia to the whole zirconia electrolyte may be 95.0 mass % or more. The ratio may be 96.0 mass % or more, 98.0 mass % or more, or 99.0 mass % or more or 99.5 mass % or more.

The zirconia electrolyte of one or more embodiments of the present invention is dense. Specifically, a relative density, which means a ratio of a bulk density to a theoretical density, is 99.0% or more. When the relative density is 99.0% or more, the strength may be high more surely. The relative density may be 99.3% or more and 99.5% or more. The relative density is calculated by the following formula.

Relative density (%)=[bulk density (g/cm$^3$)/theoretical density (g/cm$^3$)]×100

In the above formula, a theoretical density can be calculated from the volume of a unit cell of crystal and the sum of a mass of the unit cell. For example, the theoretical density of 8 mol % yttria-stabilized zirconia is 6.0 g/cm$^3$. A bulk density corresponds to a value calculated by dividing a mass of a sintered body by an exterior volume of the sintered body and can be obtained in accordance with JIS R1634. In one or more embodiments of the present invention, a bulk density is calculated by the following formula.

$$\rho_0(g/cm^3)=W_1\times\rho_1/(W_3-W_2)$$

wherein $\rho_0$ is a bulk density, $\rho_1$ is a density of water, $W_1$ is a mass of a dried zirconia electrolyte, $W_2$ is a mass of a zirconia electrolyte in water, $W_3$ is a mass of a water-saturated zirconia electrolyte.

On a fracture surface of the zirconia electrolyte according to one or more embodiments of the present invention, a standard deviation of pore numbers in 10 or more regions of which areas are 50 μm$^2$ and which are not overlapped with each other is 2.5 or more. The standard deviation is calculated from counted values of the pore numbers in 10 or more regions per one zirconia electrolyte. The form of the zirconia electrolyte according to one or more embodiments of the present invention is not particularly restricted as long as the zirconia electrolyte is in a planar state. The zirconia electrolyte may be an independent zirconia electrolyte sheet, a solid electrolyte layer in SOFC, or a solid electrolyte layer on an electrode support. The above-described fracture surface means a fracture surface in a thickness direction. The term "pore" means a bubble which independently exists within the zirconia electrolyte and is different from a through-bore to the surface.

The fracture surface of the zirconia electrolyte may be a fracture surface prepared by cutting or breaking the zirconia electrolyte in a thickness direction using a glass-cutter such as a diamond pen.

In one or more embodiments of the present invention, the fracture surface is subjected to magnification observation to count the number of a pore. For example, a scanning electron microscope (SEM) is used as a means for magnifying the fracture surface to magnify the fracture surface 1000-fold or more and 5000-fold or less, such as 4000-fold. When the magnification is 1000-fold or more, a fine pore may be sufficiently observed. When the magnification is 5000-fold or less, 10 or more regions having an area of 50 μm$^2$ and not overlapping with each other may be set in one visual field more surely. When SEM is used, carbon or an electroconductive metal such as Pt and Au may be vapor-deposited on the fracture surface for more accurate observation, since a zirconia electrolyte is not electroconductive.

In one or more embodiments of the present invention, 10 or more regions which have an area of 50 μm$^2$ and which are not overlapped with each other on the fracture surface of one zirconia electrolyte are set, and the number of a pore is counted in each region. If possible, 10 or more regions which are not overlapped with each other are set all over in one visual field. For example, the regions may be set at the peripheral part containing at least four corners, the central part, and the part between the peripheral part and the central part in a magnified visual field. When one magnified visual field is wide, a more accurate result can be obtained by setting more regions; however, the number of the set regions may be 20 or less.

The number of a pore may be counted as much as possible; however, it may be difficult to observe an excessively fine pore depending on a magnification, and such a pore gives little influence on the strength of the zirconia electrolyte. Accordingly, the diameter of a pore to be counted is 0.1 µm or more in one or more embodiments of the present invention.

The standard deviation of the pore numbers in the above-described 10 or more regions in the zirconia electrolyte of one or more embodiments of the present invention is 2.5 or more. In other words, pores are not uniformly distributed and unevenly distributed in the zirconia electrolyte of one or more embodiments of the present invention. The reason why the strength of the zirconia electrolyte which meets the above-described requirements is high is not necessarily clear; however, when the above-described standard deviation is 2.5 or more, it is expected that the strength of the zirconia electrolyte becomes higher than that of a zirconia electrolyte in which pores are uniformly dispersed, since pores are unevenly distributed and there is a part in which pore number is small in the zirconia electrolyte of one or more embodiments of the present invention.

The above-described standard deviation may be larger in one or more embodiments of the present invention. Specifically, the standard deviation may be 2.8 or more, or 3.0 or more. On the one hand, when the above-described standard deviation is 6.0 or less, a high strength may be ensured more surely, since a part having an excessively low strength due to relatively large pore number may be sufficiently reduced.

The pore number on the fracture surface of the zirconia electrolyte according to one or more embodiments of the present invention may be less. For example, the pore number in the above-described each region may be 0 or more and 20 or less, 0 or more and 15 or less, or 0 or more and 10 or less.

The diameter of a pore may be smaller and the dispersion of the diameter is less in the zirconia electrolyte of one or more embodiments of the present invention. A smaller pore gives less influence on the strength of the zirconia electrolyte, and a larger pore gives more influence on the strength of the zirconia electrolyte. When a pore diameter is small and the standard deviation of the pore diameter is small, there is not an especially large pore. Specifically, the maximum diameter of the pores observed in 10 or more above-described regions may be 1.00 µm, and the standard deviation of the pore diameter in 10 or more above-described regions may be 0.15 µm or less.

It is very difficult to comprehend and measure a three-dimensional figure of a pore inside the zirconia electrolyte; therefore, the diameter of the two-dimensional cross-sectional shape of the pore observed on the fractured surface of the zirconia electrolyte is taken as the diameter of the pore in one or more embodiments of the present invention. In addition, the maximum diameter of the pore observed by enlarging the fracture surface of the zirconia electrolyte is taken as the diameter of the pore in consideration of the influence on the strength of the zirconia electrolyte. For example, when the two-dimensional cross-sectional shape of the pore on the fracture surface is indefinite as FIG. 1, the length of the white arrow is taken as the diameter of the pore. The length may be measured using a slide gauge on the printed enlarged photograph or measured by image analysis using a commercially available software.

There may be fewer pores in a zirconia electrolyte. In one or more embodiments of the present invention, a ratio of a total pore area to a total area of the above-described 10 or more regions may be 0.5% or less. When the pores are unevenly distributed and the above-described ratio is 0.5% or less, the strength may be higher more surely. On the one hand, though the above-described ratio may be lower, the ratio may be, for example, 0.1% or more.

It is very difficult to comprehend and measure a volume of the three-dimensional pores present inside the zirconia electrolyte as well as to determine the diameter of the three-dimensional pore; therefore, an area of a two-dimensional cross-sectional shape of the pore observed on the fracture surface of the zirconia electrolyte is used as a standard of the volume in one or more embodiments of the present invention. A ratio of the pore area (%) is calculated by measuring a total area of a pore part in the above-described regions and dividing the measured total pore area by a total area of the above-described regions. In one or more embodiments of the present invention, the fracture surface of the zirconia electrolyte is magnified and observed to measure the pore area. In order to obtain a magnified image of the fracture surface, for example, the zirconia electrolyte sheet is cut using a diamond pen as a glass-cutter and fractured into an appropriate size, the fractured sheet is embedded in a resin, the fractured surface is ground using a sandpaper or a diamond slurry and washed with ethanol, Pt is vapor-deposited on the ground fractured surface, and the fractured surface is photographed using SEM as a secondary electronic image. It is not needed to adjust a magnification for measuring the pore area to be the same as the magnification for measuring the pore number, and the magnification for measuring the pore area may be adjusted for measurement and may be 5000. In order to calculate the pore area from an image obtained by a scanning electron microscope (SEM), a commercially available image analysis software can be used.

The inventors of one or more embodiments of the present invention found that when a crystalline form of the constituent zirconia is a cubical crystal, the strength of the zirconia electrolyte tends to be remarkably decreased. Accordingly, when the zirconia which composes the zirconia electrolyte is mainly a cubical crystal, the effect of one or more embodiments of the present invention is exerted more effectively. The phrase "mainly a cubical crystal" means that a ratio of a cubical crystal to the total zirconia crystals which composes the zirconia electrolyte of one or more embodiments of the present invention is more than 50%. The ratio may be not less than 60 mass % or not less than 80 mass %, not less than 90 mass % or not less than 95 mass %, or not less than 98 mass % or not less than 99 mass %. A crystalline form other than a cubical crystal is not particularly restricted, and is exemplified by a tetragonal crystal, a monoclinic crystal and a rhombohedral crystal.

A method for producing the zirconia electrolyte of one or more embodiments of the present invention is not particularly restricted. For example, the zirconia electrolyte can be efficiently produced using a binder which can improve a dispersion stability of a slurry. When a slurry of which dispersion stability is high is used, a generation of a pore due to use of an inhomogeneous slurry can be inhibited and a generation of a pore can be restricted to a part relating to the cause of the pore. As a result, a distribution of pores becomes non-uniform.

Hereinafter, each step of a typical method for producing the zirconia electrolyte of one or more embodiments of the present invention is described. In the zirconia electrolyte of one or more embodiments of the present invention, not only a solid electrolyte layer in a multi-layer structure such as a unit cell and a half cell for SOFC but also a zirconia electrolyte sheet which is present alone are included.

1. Slurry Preparation Step

In the present step, at least a stabilized zirconia powder, a solvent and the specific binder are mixed to obtain a slurry. In addition, a plasticizer, a dispersant, an antifoaming agent or the like may be added in the slurry.

As the stabilized zirconia powder, a stabilized zirconia powder having the above-described composition may be used. The stabilized zirconia powder may be pulverized by a ball mill, a beads mill or the like from the viewpoint of easy preparation of the zirconia electrolyte. A pulverization degree may be appropriately adjusted, and for example, an average secondary particle diameter may be adjusted to 0.08 µm or more and 1.0 µm or less. When a relatively fine solid electrolyte material having an average secondary particle diameter of 1.0 µm or less is used, an amount of a binder used in slurry preparation may be reduced, and a solid electrolyte layer with high density may be easily obtained. On the one hand, when the material is excessively fine, a required amount of a dispersant may become large; therefore, the average secondary particle diameter may be 0.08 µm or more. The average secondary particle diameter is may be about 0.2 µm or more and about 0.8 µm or less. For example, the secondary particle diameter can be determined as a diameter at 50% by volume, i.e. $D_{50}$, by preparing a dispersion of the solid electrolyte material, and measuring the particle size distribution thereof using a laser diffraction type particle size distribution measuring apparatus.

The solvent used for preparing the slurry is not particularly restricted, and is exemplified by an alcoholic solvent such as methanol, ethanol, 2-propanol, 1-butanol and 1-hexanol; a ketone solvent such as acetone and 2-butanone; an aliphatic hydrocarbon solvent such as pentane, hexane and heptane; an aromatic hydrocarbon solvent such as benzene, toluene, xylene and ethylbenzene; an acetic acid ester solvent such as methyl acetate, ethyl acetate and butyl acetate. The solvent may be appropriately selected from the above examples. One of the solvents may be used alone, or a plurality of the solvents may be used in combination.

The binder capable of improving a dispersion stability of the slurry is exemplified by a binder which contains a graft copolymer having a polyvinyl butyral main chain and a poly(meth)acrylic graft chain, wherein an amine value of the poly(meth)acrylic graft chain is 1 mg KOH/g or more and 90 mg KOH/g or less.

A polyvinyl butyral which constitutes the polyvinyl butyral main chain is generally produced by polymerizing vinyl acetate to obtain polyvinyl acetate, saponifying the polyvinyl acetate to obtain polyvinyl alcohol, and then acetalizing the polyvinyl alcohol with butyraldehyde. When polyvinyl acetate is saponified to obtain polyvinyl alcohol, a little amount of an acetyl group remains, since it is difficult to completely hydrolyze polyvinyl acetate. In addition, it is also difficult to butyralize all of the hydroxy groups. Accordingly, the above polyvinyl butyral has a vinyl butyral unit, a vinyl alcohol unit and a vinyl acetate unit.

A polymerization degree of the raw material polyvinyl butyral may be appropriately adjusted, and may be 200 or more and 2500 or less as an average polymerization degree. When the average polymerization degree is 200 or more, a strength of the obtained green body may be ensured more surely and it may become possible to sufficiently suppress an occurrence of a crack. On the one hand, when the average polymerization degree is 2500 or less, a hardness of the obtained green body may be made moderate, and a flexibility may be more reliable; as a result, for example, when the green body is peeled off from a base film, it may become possible to sufficiently suppress an occurrence of a defect.

A butyralization degree of the raw material polyvinyl butyral may be also appropriately adjusted, and for example, may be adjusted to 60 mass % or more and 85 mass % or less. When the butyralization degree is 60 mass % or more, a flexibility of the binder of one or more embodiments of the present invention may be enhanced more surely, a defect in the obtained green body may be sufficiently suppressed, and further it may become possible to surely secure the strength thereof. On the one hand, when the butyralization degree is excessively high, a strength of the obtained green body may be decreased, so that the butyralization degree may be 85 mass % or less. A butyralization degree of polyvinyl butyral can be measured in accordance with JIS K6728.

An amount of a hydroxy group in the raw material polyvinyl butyral may be appropriately adjusted, and for example, a ratio of a vinyl alcohol unit to a vinyl unit which constitutes the polyvinyl butyral may be 20 mol % or more and 40 mol % or less. When the ratio is 20 mol % or more, a flexibility of the obtained green body may be improved more surely. On the one hand, when the ratio is excessively high, a viscosity of the slurry may become excessively high or a flexibility of the obtained green body may become insufficient, so that the ratio may be 40 mol % or less.

A ratio of vinyl acetate in the raw material polyvinyl butyral may be appropriately adjusted, and for example, a ratio of a vinyl acetate unit to a vinyl unit which constitutes the polyvinyl butyral may be 30 mol % or less. When the ratio is 30 mol % or less, a flexibility of the obtained green body may become moderate more surely.

A glass transition temperature of the raw material polyvinyl butyral may be appropriately adjusted, and for example, may be adjusted to 50° C. or higher and 120° C. or lower.

The binder used in one or more embodiments of the present invention can be obtained by polymerizing a (meth)acrylic monomer in the presence of the raw material polyvinyl butyral and grafting the poly (meth)acrylic chain to the polyvinyl butyral main chain.

The (meth)acrylic monomer is exemplified by (meth)acrylic acid, an alkyl (meth)acrylate, hydroxy group-containing (meth)acrylate, ether group-containing (meth)acrylate, fluorine atom-containing (meth)acrylate, epoxy group-containing (meth)acrylate, an alkoxyalkyl (meth)acrylate, an aralkyl (meth)acrylate, carbonyl group-containing (meth)acrylate, nitrogen atom-containing (meth)acrylate and (meth)acrylate of which terminal carboxy group is caprolactone-modified. The (meth)acrylic monomer is not restricted to the above examples. One of the monomers may be used alone, or a plurality of the monomers may be used in combination.

In one or more embodiments of the present invention, at least nitrogen atom-containing (meth)acrylate is used.

Among (meth)acrylic monomers, (meth)acrylic acid, an alkyl (meth)acrylate and nitrogen atom-containing (meth)acrylate may be used, since a dispersion stability of the slurry can be improved, the green body excellent in moldability, surface properties and cutting processability can be obtained, and the zirconia electrolyte having the pore distribution according to one or more embodiments of the present invention can be finally obtained. One of the above monomers may be used alone, or a plurality of the above monomers may be used in combination.

An alkyl (meth)acrylate having an alicyclic structure is included in the range of the alkyl (meth)acrylate. The alkyl (meth)acrylate is exemplified by a $C_{1-18}$ alkyl (meth)acrylate such as methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, s-butyl (meth)acrylate, 2-ethylhexyl (meth)acrylate, tridecyl (meth)acrylate, n-octyl (meth)acrylate and n-lauryl (meth) acrylate; and a $C_{6-18}$ cycloalkyl (meth)acrylate such as isobornyl (meth)acrylate, cyclohexyl (meth)acrylate, 4-methylcyclohexyl (meth)acrylate, t-butylcyclohexyl (meth)acrylate and cyclododecyl (meth)acrylate. One or more embodiments of the present invention is not restricted to the above examples. One of the above monomers may be used alone, or a plurality of the above monomers may be used in combination.

Among the alkyl (meth)acrylates, a $C_{2-8}$ alkyl (meth) acrylate may be used and n-butyl (meth)acrylate may be used, since the green body excellent in moldability, surface properties and cutting processability can be obtained, and the zirconia electrolyte having the pore distribution according to one or more embodiments of the present invention can be finally obtained.

A content rate of the alkyl (meth)acrylate in the (meth) acrylic monomer may be 30 mass % or more and 95 mass % or less, or 40 mass % or more and 80 mass % or less, since the green body excellent in moldability, surface properties and cutting processability can be obtained, and the zirconia electrolyte having the pore distribution according to one or more embodiments of the present invention can be finally obtained.

The nitrogen atom-containing (meth)acrylate is exemplified by aziridinyl group-containing (meth)acrylate such as 2-aziridinylethyl (meth)acrylate in addition to dimethylaminoethyl (meth)acrylate, diethylaminoethyl (meth)acrylate and ethylene oxide-added (meth)acrylate of morpholine. Since a dispersion stability of the slurry can be improved, the green body excellent in moldability, surface properties and cutting processability can be obtained, and the zirconia electrolyte having the pore distribution according to one or more embodiments of the present invention can be finally obtained, dimethylaminoethyl (meth)acrylate and diethylaminoethyl (meth)acrylate may be used. A content rate of the nitrogen atom-containing (meth)acrylate in the (meth) acrylic monomer may be 0.1 mass % or more and 30 mass % or less, or 1 mass % or more and 23 mass % or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The hydroxy group-containing (meth)acrylate is exemplified by hydroxy group-containing (meth)acrylate of which hydroxyalkyl group has a carbon number of 1 or more and 18 or less, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth) acrylate and caprolactone-modified hydroxy (meth)acrylate. One or more embodiments of the present invention is not restricted to the above examples. One of the above monomers may be used alone, or a plurality of the above monomers may be used in combination.

Among the hydroxy group-containing (meth)acrylates, hydroxy group-containing (meth)acrylate of which hydroxyalkyl group has a carbon number of 1 or more and 4 or less may be used, 2-hydroxyethyl (meth)acrylate, 2-hydroxypropyl (meth)acrylate and 2-hydroxybutyl (meth)acrylate may be used, and 2-hydroxypropyl (meth)acrylate may be used, since a dispersion stability of the slurry can be improved, the green body excellent in moldability, surface properties and cutting processability can be obtained, and the zirconia electrolyte having the pore distribution according to one or more embodiments of the present invention can be finally obtained.

A content rate of the hydroxy group-containing (meth) acrylate in the (meth)acrylic monomer may be 0 mass % or more and 10 mass % or less, or 1 mass % or more and 5 mass % or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The ether group-containing (meth)acrylate is exemplified by (di)ethylene glycol (methyl ether) (meth)acrylate, such as ethylene glycol (meth)acrylate, ethylene glycol methyl ether (meth)acrylate, di(ethylene glycol) (meth)acrylate and di(ethylene glycol) methyl ether (meth)acrylate. One or more embodiments of the present invention is not restricted to the examples. One of the above monomers may be used alone, or a plurality of the above monomers may be used in combination.

The fluorine atom-containing (meth)acrylate is exemplified by fluorine atom-containing (meth)acrylate having a fluorine atom in the ester group, such as trifluoroethyl (meth)acrylate, tetrafluoropropyl (meth)acrylate, octafluoropentyl (meth)acrylate, perfluorobutylethyl (meth)acrylate, perfluoroisononylethyl (meth)acrylate and perfluorooctyl (meth)acrylate. One or more embodiments of the present invention is not restricted to the examples. One of the above monomers may be used alone, or a plurality of the above monomers may be used in combination.

The epoxy group-containing (meth)acrylate is exemplified by glycidyl (meth)acrylate, α-methylglycidyl (meth) acrylate and 3,4-epoxycyclohexylmethyl (meth)acrylate. One or more embodiments of the present invention is not restricted to the examples. One of the above monomers may be used alone, or a plurality of the above monomers may be used in combination.

The alkoxyalkyl (meth)acrylate is exemplified by 2-(2-vinyloxyethoxy)ethyl (meth)acrylate, methoxyethyl (meth) acrylate, methoxybutyl (meth)acrylate, ethoxybutyl (meth) acrylate, trimethylolpropanetripropoxy (meth)acrylate and 2-ethylhexylcarbitol (meth)acrylate. One or more embodiments of the present invention is not restricted to the examples. One of the above monomers may be used alone, or a plurality of the above monomers may be used in combination.

The aralkyl (meth)acrylate is exemplified by an aralkyl (meth)acrylate having an aralkyl group of which carbon number is 7 or more and 18 or less, such as benzyl (meth)acrylate, phenylethyl (meth)acrylate, methylbenzyl (meth)acrylate and naphthylmethyl (meth)acrylate. One or more embodiments of the present invention is not restricted to the examples. One of the above monomers may be used alone, or a plurality of the above monomers may be used in combination.

The carbonyl group-containing (meth)acrylate is exemplified by acetonyl (meth)acrylate, diacetone (meth)acrylate, 2-(acetoacetoxy)ethyl (meth)acrylate, oxocyclohexylmethyl (meth)acrylate and 2-(acetoacetoxy)ethyl (meth)acrylate. One or more embodiments of the present invention is not restricted to the examples. One of the above monomers may be used alone, or a plurality of the above monomers may be used in combination.

When the raw material polyvinyl butyral and the (meth)acrylic monomer are reacted, an organic solvent may be used. Such an organic solvent is exemplified by an aromatic organic solvent such as toluene and xylene; an alcoholic organic solvent such as 1-butanol, propylene glycol methyl ether, diacetone alcohol and ethyl cellosolve; an ester organic solvent such as ethyl acetate, butyl acetate and cellosolve acetate; a ketone organic solvent such as 2-butanone, methyl isobutyl ketone and cyclohexanone; and dimethylformamide. One or more embodiments of the present invention is not restricted to the examples. One of the above organic solvents may be used alone, or a plurality of the above organic solvents may be used in combination. An amount of the organic solvent is not particularly restricted as long as the raw material polyvinyl butyral can be sufficiently dissolved. In general, an amount of the organic solvent to 100 parts by mass of a total of the raw material polyvinyl butyral and the (meth)acrylic monomer may be about 50 parts by mass or more and 500 parts by mass or less.

When the raw material polyvinyl butyral and the (meth)acrylic monomer are reacted, a polymerization initiator may be used. Such a polymerization initiator is exemplified by an initiator of radical polymerization, such as 2,2'-azobis-(2-methylbutyronitrile), t-butyl-2-ethylperoxyhexanoate, 2,2'-azobisisobutyronitrile, benzoyl peroxide and di-t-butyl peroxide. One or more embodiments of the present invention is not restricted to the examples. One of the above polymerization initiators may be used alone, or a plurality of the above polymerization initiators may be used in combination. An amount of the polymerization initiator is not particularly restricted, and an amount of the polymerization initiator to 100 parts by mass of the (meth)acrylic monomer may be about 0.1 parts by mass or more and 20 parts by mass or less, or about 1 part by mass or more and 10 parts by mass or less. As a method for adding the polymerization initiator, charging in a mass, installment charging and continuous drip are exemplified. One or more embodiments of the present invention is not restricted to the examples. From the viewpoint of promoting the reaction between the raw material polyvinyl butyral and the (meth)acrylic monomer, a part of the polymerization initiator may be added before or after completion of the addition of the (meth)acrylic monomer into the reaction system.

In order to adjust a molecular weight of the graft copolymer, a chain transfer agent may be used. Such a chain transfer agent is exemplified by 2-ethylhexyl thioglycolate, t-dodecyl mercaptan, n-octyl mercaptan, n-dodecyl mercaptan, mercaptoacetic acid, mercaptopropionic acid, 2-mercaptoethanol, α-methylstyrene and α-methylstyrene dimer. One or more embodiments of the present invention is not restricted to the examples. One of the above chain transfer agents may be used alone, or a plurality of the above chain transfer agents may be used in combination.

A temperature at which the raw material polyvinyl butyral and the (meth)acrylic monomer are reacted is not particularly restricted, and may be 50° C. or higher and 120° C. or lower, or 60° C. or higher and 110° C. or lower. The reaction temperature may be constant or may be changed during the polymerization reaction.

A time to react the raw material polyvinyl butyral and the (meth)acrylic monomer is not particularly restricted, may be appropriately set depending on the progress of the reaction, and is usually 2 hours or more and 12 hours or less.

The graft copolymer can be obtained by reacting the raw material polyvinyl butyral and the (meth)acrylic monomer as described above.

A ratio of the polyvinyl butyral main chain and the poly(meth)acrylic graft chain in the graft copolymer may be appropriately adjusted. For example, a ratio of the polyvinyl butyral main chain to 100 mass % of the total of the polyvinyl butyral main chain and the poly(meth)acrylic graft chain may be 10 mass % or more and 99 mass % or less, or 20 mass % or more and 90 mass % or less, since a dispersion stability of the slurry can be improved, the green body excellent in moldability, surface properties and cutting processability can be obtained, and the zirconia electrolyte having the pore distribution according to one or more embodiments of the present invention can be finally obtained. Relatively, a ratio of the poly(meth)acrylic graft chain to 100 mass % of the total of the polyvinyl butyral main chain and the poly(meth)acrylic graft chain may be 1 mass % or more and 90 mass % or less, or 10 mass % or more and 80 mass % or less. The ratio of the polyvinyl butyral main chain and the poly(meth)acrylic graft chain in the graft copolymer may be determined from ratios of the used raw material polyvinyl butyral and (meth)acrylic monomer.

For example, an average molecular weight of the graft copolymer as a polymerization average molecular weight may be 5,000 or more and 1,000,000 or less, 20,000 or more and 500,000 or less, or 30,000 or more and 300,000 or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The polymerization average molecular weight of the graft copolymer can be determined by gel permeation chromatography (GPC). For example, a gel permeation chromatograph analyzer ("HLC-8220 GPC" manufactured by Tosoh Corporation), separation column ("TSKgel Super HZM-M" manufactured by Tosoh Corporation), and tetrahydrofuran as a solvent are used, and the polymerization average molecular weight converted by using standard polystyrene (manufactured by Tosoh Corporation) can be determined.

A glass transition temperature of the poly (meth)acrylic graft chain in one or more embodiments of the present invention may be lower than 0° C., −50° C. or higher and −5° C. or lower, or −30° C. or higher and −8° C. or lower, since a dispersion stability of the slurry can be improved, the green body excellent in moldability, surface properties and cutting processability can be obtained, and the zirconia electrolyte having the pore distribution according to one or more embodiments of the present invention can be finally obtained.

The glass transition temperature of the poly(meth)acrylic graft chain in the graft copolymer can be determined by the following Fox formula on the basis of a glass transition temperature (Tg) (unit: absolute temperature K) of a homopolymer of the monomer contained in the monomer component used as the raw material of the poly(meth)acrylic graft chain and a mass fraction of the monomer. $1/Tg = W_1/Tg_1 + W_2/Tg_2 + W_3/Tg_3 + \ldots + W_n/Tg_n$ wherein Tg is a glass transition temperature (K) to be determined of the polymer, $W_1$ to $W_n$ are mass fractions of the respective monomers, $Tg_1$ to $Tg_n$, are glass transition temperatures (K) of homopolymers of the respective monomers corresponding to each monomer of the mass fractions.

For example, glass transition temperatures of a homopolymer of n-butyl acrylate, a homopolymer of hydroxypropyl acrylate, a homopolymer of dimethylaminoethyl methacrylate and a homopolymer of acrylic acid are respectively 20° C., −7° C., 19° C. and 106° C. A glass transition temperature of a homopolymer of each monomer can also be measured by DSC (differential scanning calorimeter), DTA (differential thermal analyzer), TMA (thermomechanical measuring device) or the like.

A composition of the raw material (meth)acrylic monomer which constitutes the poly(meth)acrylic graft chain may be determined so that the poly(meth)acrylic graft chain having a desired glass transition temperature can be obtained.

The amine value of the poly(meth)acrylic graft chain in the graft copolymer may be 1 mg KOH/g or more and 90 mg KOH/g or less, or 5 mg KOH/g or more and 85 mg KOH/g or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The amine value of the poly(meth)acrylic graft chain in the graft copolymer can be determined by the following formula.

Amine value (mg KOH/g) of poly(meth)acrylic graft chain={[content rate (mass %) of nitrogen atom-containing monomer used as a raw material of poly(meth)acrylic graft chain×0.01]÷(molecular weight of nitrogen atom-containing monomer)}×56100

The acid value of the poly(meth)acrylic graft chain of the graft copolymer may be 0 mg KOH/g or more and 20 mg KOH/g or less, 0 mg KOH/g or more and 15 mg KOH/g or less, 0.1 mg KOH/g or more and 10 mg KOH/g or less, or 0.5 mg KOH/g or more and 5 mg KOH/g or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The acid value of the poly(meth)acrylic graft chain of the graft copolymer can be determined by the following formula.

Acid value (mg KOH/g) of poly(meth)acrylic graft chain={[content rate (mass %) of monomer having carboxy group used as raw material for poly(meth)acrylic graft chain×0.01]÷(molecular weight of monomer having carboxy group)}×56100

The hydroxy group value of the poly(meth)acrylic graft chain of the graft copolymer may be 0 mg KOH/g or more and 30 mg KOH/g or less, or 1 mg KOH/g or more and 20 mg KOH/g or less, since a dispersion stability of the slurry can be improved, the green body excellent in moldability, surface properties and cutting processability can be obtained, and the zirconia electrolyte having the pore distribution according to one or more embodiments of the present invention can be finally obtained.

The hydroxy group value of the poly(meth)acrylic graft chain in the graft copolymer can be determined by the following formula.

Hydroxy group value (mg KOH/g) of poly(meth)acrylic graft chain={[content rate (mass %) of monomer having hydroxy group used as a raw material for poly(meth)acrylic graft chain×0.01]÷(molecular weight of monomer having hydroxy group)}×56100

The composition of the raw material (meth)acrylic monomer which constitutes the poly(meth)acrylic graft chain is adjusted such that at least the amine value of the obtained poly(meth)acrylic graft chain becomes a desired value, and the acid value and the hydroxy group value also may become desired values.

The above-described each component may be mixed by an ordinary method. For example, when a solid electrolyte material having a desired secondary particle size is preliminarily obtained, the components may be mixed under the condition that the components are not further pulverized using a disperser or the like. When a secondary particle of a stabilized zirconia powder is not preliminarily adjusted, the components may be pulverized and mixed until the secondary particle becomes desired value using a ball mill or the like.

2. Step of Preparing Green Body

Next, a green body is obtained by applying the slurry to a base material to be tape-shaped or sheet-shaped and then drying the tape-shaped or sheet-shaped slurry. The above-described slurry is excellent at dispersion stability presumably due to high affinity between the binder and the stabilized zirconia powder. As a result, the green body prepared from the above-described slurry exhibits very high homogeneity and is excellent at moldability, surface properties and cutting processability. In one or more embodiments of the present invention, not only a stand-alone sheet precursor but also a precursor of a solid electrolyte layer on an electrode support before sintering is conveniently referred to as a green body.

When a zirconia electrolyte sheet is produced, a base material film such as PET film is used as a base material. When a solid electrolyte layer is formed on an electrode support, an electrode support is used as a base material.

A method for applying the slurry is not particularly restricted. As the method, an ordinary method such as a doctor blade method and a calendar roll method can be used. Specifically, for example, the slurry is transported to a coating dam, cast on a base material by a doctor blade so that the thickness becomes uniform, and dried to form a green body.

A shape and a size of the green body may be determined depending on a shape and a size of the target zirconia electrolyte sheet and the target solid electrolyte layer. For example, the shape and size may be tailored to a base material. When a zirconia electrolyte sheet is produced, a tape-shaped green body having a width of 5 cm or more and 200 cm or less may be produced and then the green body may be cut into a desired shape and size.

3. Sintering Step

Next, the green body is sintered to obtain the zirconia electrolyte sheet or the solid electrolyte layer. A sintering condition may be appropriately adjusted, for example, the green body may be sintered at 1200° C. or higher and 1500° C. or lower. When the green body is sintered at 1200° C. or higher, a sufficient sintering effect may be obtained and high toughness can be achieved. On the one hand, when the sintering temperature is too high, a crystal grain size of the sheet may become excessively large and a toughness may be rather lowered; therefore, the upper limit may be set to 1500° C.

A shape and a size of the zirconia electrolyte sheet and the solid electrolyte layer according to one or more embodiments of the present invention may be appropriately determined. For example, in the case of a zirconia electrolyte sheet which can be used as a solid electrolyte layer of an electrolyte-supported cell (ESC), a thickness thereof may be 80 μm or more and 300 μm or less. The thickness the upper limit 150 μm or less, 140 μm or less, 130 μm or less, or 120 μm or less. In the cases of an anode-supported cell (ASC), a cathode-supported cell (CSC), a metal-supported cell (MSC) and a solid electrolyte layer of a half cell, a thickness thereof may be 3 μm or more and 50 μm or less.

In order to produce a unit cell for SOFC, a cathode layer or the like may be formed on the thus obtained zirconia electrolyte sheet and solid electrolyte layer by an ordinary method. For example, when the zirconia electrolyte sheet is produced by one or more embodiments of the present invention, in general, an anode layer is firstly formed on the one side of the sheet and then a cathode layer is formed on the opposite side due to sintering temperatures. Between the zirconia electrolyte sheet as a solid electrolyte layer and a cathode layer, an intermediate layer to inhibit an interlayer reaction may be formed. Such an intermediate layer may be formed in advance of an anode layer. Alternatively, an intermediate layer may be formed by respectively applying an intermediate layer slurry and an anode layer slurry, drying the slurries and then simultaneously sintering the slurries.

Since the zirconia electrolyte according to one or more embodiments of the present invention has high strength, a SOFC unit cell and SOFC having the zirconia electrolyte also have high strength and is excellent at resistance property.

EXAMPLES

Hereinafter, the examples of one or more embodiments of the present invention are described to demonstrate one or more embodiments of the present invention more specifically, but one or more embodiments of the present invention is in no way restricted by the examples, and the examples can be appropriately modified to be carried out within a range which adapts to the contents of this specification. Such a modified example is also included in the range of one or more embodiments of the present invention.

Example 1: Preparation of Zirconia Electrolyte Sheet (1) Preparation of Binder
In a 2 L flask equipped with a stirrer, a dropping port, a thermometer, a cooling tube and a tube for introducing a nitrogen gas, 1332 parts by mass of 1-butanol and 233 parts by mass of a medium polymerization degree type polyvinyl butyral resin ("S-LEC BM-S" manufactured by SEKISUI CHEMICAL CO., LTD.) were added. The polyvinyl butyral resin was dissolved with stirring the mixture. Next, the gas phase in the flask was substituted with nitrogen by injecting a nitrogen gas for 30 minutes, and the temperature of the mixture was increased to 100° C. with stirring. After the temperature became 100° C., 64.2 parts by mass of butyl methacrylate, 7 parts by mass of dimethylaminoethyl methacrylate, 0.3 parts by mass of acrylic acid, 3.5 parts by mass of hydroxypropyl acrylate, 25 parts by mass of 2-ethylhexyl acrylate and 4 parts by mass of t-butyl peroxy-2-ethyl-hexanoate as a polymerization initiator were continuously added dropwize into the flask over 30 minutes. The mixture in the flask was heated at 100° C. for 5 hours. After 5 hours, 1-butanol was added into the flask so that the ratio of the non-volatile component became 25 mass % to obtain graft copolymer binder A1 having a weight-average molecular weight of 185,000.

The calculated amine value, acid value and hydroxy group value of the poly(meth)acrylic graft chain part which was grafted on the raw material polyvinyl butyral are shown in Table 1.

(2) Preparation of Zirconia Electrolyte Sheet
To 100 parts by mass of a commercially available 10Sc1CeSZ powder stabilized by 10 mol % scandia and 1 mol % ceria (product name: "10Sc1CeSZ" manufactured by DAIICHI KIGENSO KAGAKU KOGYO CO., LTD., specific surface area: 11 m$^2$/g, $D_{50}$: 0.6 μm, $D_{90}$: 1.27 μm), total 98 parts by mass of a mixed solution containing 15 parts by mass of the above-described binder, 6 parts by mass of dibutyl phthalate as a plasticizer, 1 part by mass of a carboxy group-containing polymer having an acid value of about 58 as a dispersant, 58 parts by mass of 2-butanone and 40 parts by mass of 1-butanol as a solvent was added. The mixture was mixed using a pot mill with a zirconia ball having a diameter of 10 mm for 20 hours to obtain a slurry composition.

The slurry composition was subjected to defoaming and the viscosity thereof was adjusted to about 2 Pa·s. Then, the slurry composition was applied to a PET film with doctor blade method and dried with hot air at 100° C. for 50 minutes to obtain a green tape having a thickness of 0.18 mm.

The green tape was cut into a 67 mm square and sandwiched between alumina porous sheets having a porosity of about 70% to obtain a laminated body. Similarly, ten laminated bodies were prepared. The laminated bodies were placed on a shelf board in an electric furnace and sintered at the highest temperature of 1420° C. for 2 hours at the highest temperature to obtain ten about 50 mm square zirconia electrolytes.

Example 2: Preparation of Zirconia Electrolyte Sheet

Graft copolymer binder A2 was prepared similarly to Example 1(1) except that amounts of the raw materials of the poly(meth)acrylate resin graft chain were changed as shown in Table 1, and ten zirconia electrolyte sheets of one or more embodiments of the present invention were prepared similarly to Example 1(2) except that the graft copolymer binder A2 was used.

Example 3: Preparation of Zirconia Electrolyte Sheet

Similarly to Example 1 except that a commercially available 8YSZ powder stabilized with 8 mol % yttria (Product name: "OZC-8YC" manufactured by Sumitomo Osaka Cement Co., Ltd.) was used instead of 10Sc1CeSZ powder, ten zirconia electrolyte sheets of one or more embodiments of the present invention were prepared.

Example 4: Preparation of Zirconia Electrolyte Sheet

Graft copolymer binder A3 was prepared similarly to Example 1(1) except that amounts of the raw materials of the poly(meth)acrylate resin graft chain were changed as shown in Table 1, and ten zirconia electrolyte sheets of one or more embodiments of the present invention were prepared similarly to Example 1(2) except that the graft copolymer binder A3 was used.

Comparative Example 1

Preparation of Zirconia Electrolyte Sheet

Similarly to Example 1 except that a commercially available polyvinyl butyral resin (product name: "BLS" manufactured by SEKISUI CHEMICAL CO., LTD.) was used as a binder, ten zirconia electrolyte sheets were prepared.

Comparative Example 2

Preparation of Zirconia Electrolyte Sheet

Similarly to Example 1 except that methacrylate copolymer (number average molecular weight: 55000, glass transition temperature: −8° C., concentration of solid component: 50 mass %) was used as a binder, ten zirconia electrolyte sheets were prepared.

fracture cross-section was oval, a major axis was determined as a pore diameter. The above measurement was performed on four sheets of each Example and Comparative example, and the average values were calculated. The result is shown in Table 2. In addition, the average pore number in the above-described regions of the sheet of Comparative example 2 was 5.1, and the standard deviation of the pore number was 2.3.

From ten sheets prepared in the above-described Examples 1 to 4 and Comparative example 1, four sheets were arbitrarily selected. A sheet having a width of about 1 cm was cut and taken from the selected sheets using a diamond pen as a glass-cutter, and then broken by bending with a hand. The sheet was embedded in a resin, and the fracture cross-section was ground using a sandpaper and a diamond slurry and washed with ethanol to obtain a sample for measurement. Pt was vapor-deposited on the obtained sample, and 5000 times enlarged photographs were taken at 5 parts all over the fracture cross-section using SEM. The photograph was analyzed using an image analysis software ("Image-Pro") to measure the area of pores having the maximum diameter of 0.1 μm or more, the area was divided by the area of the SEM field, and the average value of the

TABLE 1

|  |  | Example 1 | Examples 2, 3 | Example 4 |
|---|---|---|---|---|
|  | Polybutyral resin | Medium polymerization degree 233 parts | Medium polymerization degree 233 parts | Medium polymerization degree 233 parts |
| Poly(meth)acrylic graft chain | Butyl methacrylate | 64.2 parts | 74.4 parts | 71.1 parts |
|  | Dimethylaminoethyl methacrylate | 7 parts | 1.4 parts | 0 part |
|  | Acrylic acid | 0.3 parts | 0.3 parts | 0.3 parts |
|  | 2-Hydroxypropyl acrylate | 3.5 parts | 3.5 parts | 3.5 parts |
|  | 2-Ethylhexyl acrylate | 25 parts | 20.4 parts | 25.1 parts |
|  | t-Butyl peroxy-2-ethylhexanoate | 4 parts | 4 parts | 4 parts |
|  | n-Butanol | 1332 parts | 1332 parts | 1332 parts |
|  | Calculated Tg | −10° C. | −5° C. | −10° C. |
|  | Amine value (mgKOH/g) | 25 | 2.1 | 0 |
|  | Acid value (mgKOH/g) | 2 | 2 | 2 |
|  | Hydroxy group value (mgKOH/g) | 15 | 15 | 15 |
| Evaluation of polymerization reaction mixture | Non-volatile content | 25.0 | 25.0 | 25.0 |
|  | Weight average molecular weight | 185,000 | 191,000 | 190,000 |
|  | Graft polymer | A1 | A2 | A3 |

Test Example 1

Measurement of Pore Number or the Like

Figure 1:
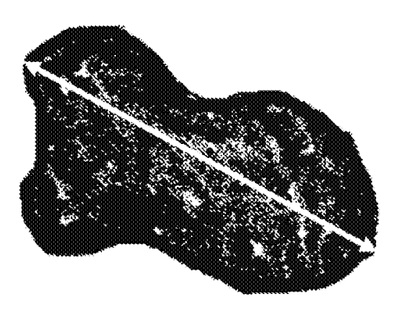
FIG. 1 is a FIGURE to explain a method for determining a diameter of a pore.

From each of ten sheets prepared in the above-described Examples 1 to 4 and Comparative examples 1 and 2, four sheets were arbitrarily selected and broken into small pieces by scratching the sheets with a diamond pen as a glass-cutter and bending the scratched sheets with a hand. Pt was vapor-deposited on the fracture cross-section, a 4000 times enlarged photograph of the fracture cross-section was taken using SEM. All over the photograph, 12 regions of 7.07×7.07 μm were set without overlap. The number of pores in each region was measured, and the average value and standard deviation were calculated. In addition, the sizes of pores were measured, the maximum diameter and average diameter were determined, and further the standard deviation was calculated. The pore size was the maximum diameter of each pore as shown in FIG. 1, and the number of pore having the maximum diameter of 0.1 μm or more was determined because of the large effect on the strength. For example, when the two-dimensional shape of a pore observed on the calculated values was determined as a pore area (%). The above measurement was performed on each four sheets, and the average was calculated. The result is shown in Table 2.

Test Example 2: Measurement of Three-Point Bonding Strength

From the sheets prepared in the above-described Examples 1 to 4 and Comparative example 1, forty rectangles having 4 mm width×40 mm length were cut out using a high speed diamond cutter. Among the rectangle sheets, twenty sheets were exposed to 850° C. in an electric furnace for 1000 hours. The rectangle sheets were placed on a three-point bonding test jig having a distance between supporting points of 30 mm in reference to JIS R1601, and the jig was set on Universal Testing Instrument 4301 manufactured by Instron. Then, a load was applied on the sheet at a cross-head speed of 0.5 ram/min, a stress at the time of fracture was measured, and an average value of 20 measured stress values was calculated as three-point bonding strength. In addition, a decrease rate of a measurement result after the treatment at 850° C. for 1000 hours to a measurement result at room temperature was calculated. The results are shown in Table 2.

TABLE 2

|  | Example 1 | Example 2 | Example 3 | Example 4 | Comparative example 1 |
|---|---|---|---|---|---|
| Raw material powder | 10Sc1CeSZ | 10Sc1CeSZ | 8YSZ | 10Sc1CeSZ | 8YSZ |
| Binder | A1 | A2 | A2 | A3 | BLS |
| Pore number |  |  |  |  |  |
| Average of number in 50 μm² □ | 4.7 | 3.8 | 3.2 | 6.4 | 15.4 |
| Distribution of number in 50 μm² □ | 1~9 | 0~10 | 0~9 | 14~20 | 2~12 |
| Standard deviation of number in 50 μm² □ | 2.8 | 3.0 | 3.2 | 2.6 | 2.4 |
| Pore diameter |  |  |  |  |  |
| Maximum | 0.29 μm | 0.33 μm | 0.28 μm | 0.81 μm | 1.14 μm |
| Number average diameter | 0.18 μm | 0.17 μm | 0.16 μm | 0.32 μm | 0.28 μm |
| Standard deviation | 0.07 μm | 0.07 μm | 0.07 μm | 0.11 μm | 0.19 μm |
| Ratio of total area of pores to 50 μm² □ | 0.24% | 0.20% | 0.18% | 0.48% | 0.81% |
| Density |  |  |  |  |  |
| Absolute density | 5.73 g/cm³ | 5.73 g/cm³ | 5.88 g/cm³ | 5.73 g/cm³ | 5.79 g/cm³ |
| Relative density | 99.3% | 99.3% | 98.5% | 99.1% | 97.0% |
| Three-point bending strength | 324 MPa | 330 MPa | 354 MPa | 307 MPa | 273 MPa |
| Strength decrease rate after treatement at 850° C. for 1000 hours | 3% | 4% | 6% | 7% | 9% |

As the result shown in Table 2, with respect to the zirconia electrolyte sheet of Comparative example 2 of which standard deviation of the pore number on the fracture cross-section was 2.4, the three-point bending strength was relatively low and the strength decrease rate after high temperature treatment was high. On the one hand, when the standard deviation was 2.6 or more, three-point bending strength was relatively high and strength decrease rate after high temperature treatment was low. The higher the standard deviation was, the more evident such a tendency became. Thus, it is experimentally demonstrated by the result that the strength of the zirconia electrolyte sheet of one or more embodiments of the present invention of which the above-described standard deviation is high and in which fine pores are unevenly distributed is high.

The invention claimed is:

1. A zirconia electrolyte,
   essentially consisting of zirconia stabilized by one or a plurality of oxides of rare earth selected from the group of scandium, yttrium, cerium, gadolinium and ytterbium,
   wherein a standard deviation of a number of pores observed in an area of 50 μm² of a fracture surface of the zirconia electrolyte is 2.5 or more, a diameter of the pore to be counted is 0.1 μm or more, and the number of pores are counted in 10 or more non-overlapping regions per one zirconia electrolyte.

2. The zirconia electrolyte according to claim 1, wherein a standard deviation of pore diameters in the regions is 0.15 μm or less.

3. The zirconia electrolyte according to claim 2, wherein a ratio of a total area of the pores to a total area of the regions is 0.5% or less.

4. The zirconia electrolyte according to claim 1, wherein a ratio of a total area of the pores to a total area of the regions is 0.5% or less.

5. The zirconia electrolyte according to claim 1, wherein the zirconia electrolyte is planate.

6. The zirconia electrolyte according to claim 1, wherein a relative density of the zirconia electrolyte is 99.0% or more.

7. The zirconia electrolyte according to claim 1, wherein 90% or more of the zirconia is cubical crystal.

8. The zirconia electrolyte according to claim 1, wherein a maximum diameter of the pores observed in the 10 or more regions is 1.00 μm or less.

9. The zirconia electrolyte according to claim 1, wherein an amine value of the poly(meth)acrylic graft chain is 1 mg KOH/g or more and 90 mg KOH/g or less.

10. The zirconia electrolyte according to claim 1, wherein zirconia electrolyte essentially consists of zirconia stabilized by the oxide of gadolinium.

11. A unit cell for a solid oxide fuel cell, comprising the zirconia electrolyte according to claim 1 as a solid electrolyte layer.

12. A unit cell for a solid oxide fuel cell, comprising the zirconia electrolyte according to claim 2 as a solid electrolyte layer.

13. A unit cell for a solid oxide fuel cell, comprising the zirconia electrolyte according to claim 4 as a solid electrolyte layer.

14. A unit cell for a solid oxide fuel cell, comprising the zirconia electrolyte according to claim 3 as a solid electrolyte layer.

15. A method for producing the zirconia electrolyte of claim 1, comprising the steps of:
   preparing a slurry by mixing a powder of zirconia stabilized by one or a plurality of oxides of rare earth selected from the group of scandium, yttrium, cerium, gadolinium and ytterbium, a solvent and a binder, wherein the binder comprises a graft copolymer having a polyvinyl butyral main chain and a poly(meth)acrylic graft chain, and an amine value of the poly(meth) acrylic graft chain is 1 mg KOH/g or more and 90 mg KOH/g or less,
   preparing a green body by forming the slurry into a sheet and then drying the sheet, and
   sintering the green body.

16. The method according to claim 15, wherein a glass transition temperature of the poly(meth)acrylic graft chain is lower than 0° C.

17. The method according to claim 15, wherein an acid value of the poly(meth)acrylic graft chain is 0.1 mg KOH/g or more and 15 mg KOH/g or less.

18. The method according to claim 15, wherein a hydroxy group value of the poly(meth)acrylic graft chain is 1 mg KOH/g or more and 20 mg KOH/g or less.

19. The method according to claim 15, wherein the zirconia electrolyte is used as a solid electrolyte layer for a solid oxide fuel cell.

\* \* \* \* \*